Sept. 8, 1964 G. M. STAMPS 3,148,244

CONTINUOUS-FEED FACSIMILE SCANNER

Original Filed March 30, 1954

2 Sheets-Sheet 1

INVENTOR.

GEORGE M. STAMPS

BY J. B. Burke

ATTORNEY

Sept. 8, 1964 G. M. STAMPS 3,148,244

CONTINUOUS-FEED FACSIMILE SCANNER

Original Filed March 30, 1954 2 Sheets-Sheet 2

*INVENTOR.*

GEORGE M. STAMPS

BY J. B. Burke

*ATTORNEY*

3,148,244

CONTINUOUS-FEED FACSIMILE SCANNER

George M. Stamps, New Hyde Park, N.Y., assignor, by mesne assignments, to Hogan Faximile Corporation, a corporation of Delaware Continuation of application Ser. No. 419,747, Mar. 30, 1954. This application Apr. 11, 1960, Ser. No. 21,556
10 Claims. (Cl. 178—7.6)

This invention relates to the art of facsimile scanners and particularly concerns an apparatus for scanning graphic copy continuously to produce corresponding electrical signals for transmission to a suitable graphic copy recorder. This application is a continuation-in-part of my copending application Serial No. 291,144 filed June 2, 1952, now Patent No. 2,967,907, issued Jan. 10, 1961, and a continuation of my application Serial No. 419,747 filed March 30, 1954 now abandoned.

It is a principal object of the invention to provide a compact relatively simple and inexpensive apparatus for scanning continuous-feed graphic copy.

It is a further object to provide a continuous-feed graphic copy scanner including flat disks having spiral scanning apertures.

It is another object to provide a continuous-feed graphic copy scanner having a folded optical path and including flat spiral scanning elements.

It is another object to provide a mask for varying the cross sectional configuration of an optical path in a graphic copy scanner.

It is another object to provide a scanning member including a spiral window and spiral groove adatped to combine the functions of a scanning element and lens system.

Other and further objects of the invention will become apparent from the following description.

Heretofore the typical scanner used in facsimile transmission has been of what may be called the "lathe" type. In such scanners the subject copy, whose graphic content is generally to be delivered electrically to a distant recording point, is wrapped around and somehow fastened to the surface of a cylindrical drum. The copy-carrying drum is then rotated and, by means of a track and lead-screw, a photoelectric "tool" is moved axially along the rotating cylinder so as to trace a helical path over the whole copy surface. Successive turns of the helix so traced constitute the successive scanned lines of the image to be transmitted. The mechanical operation is analogous to that of a screw-cutting lathe, and the design problems and limitations are quite similar. Thus, the lathe-type facsimile scanner is usually large, heavy, expensive, and inflexible as to its optical system. Moreover, it has the inherent operating disadvantages that:

(*a*) After each transmission the old subject copy must be removed from the drum and new copy wrapped around and fastened to it; and (*b*) The subject material must be in the form of thin flexible single sheets of limited length. Thus the pages of a bound book or magazine cannot be handled unless the binding is destroyed, and sheets of extended length must be cut or folded and handled in sections.

There have been a number of attempts made to devise facsimile scanners that would be free from some or all of the disadvantages above enumerated. In one such scanner a bright spot of light is developed upon the screen of a cathode-ray tube, swept in a straight line across the screen and projected upon the subject copy to provide fast or side-to-side scanning. Slow, or end-to-end, scanning is obtained by progressively moving the copy. In this electronic type of scanner, difficulties arise from the inherent lack of linearity of line sweep and non-uniformity of scanning spot brightness and the maximum definition obtainable is low compared with that obtainable by mechanical scanning as disclosed herein. In another known type of continuous scanner, a moving light spot is produced by illuminating the intersection between a stationary linear slit and a rotatable helical slit, both slits being formed in opaque members. This type of scanner is limited to use with transparent copy and has other implicit limitations.

The present invention is intended to avoid or overcome all of the limitations and difficulties of prior facsimile scanners. The invention is adapted for use in facsimile broadcasting as well as for short-distance wire transmission and long-distance microwave transmission. The invention employs scanning disks including continuous flat spiral apertures or windows of types disclosed in my copending patent application U.S. Serial No. 291,144 filed June 2, 1952, of which this application is a continuation-in-part. The invention employs a double disk scanning arrangement which gives a higher definition than can be had from a comparable single-spiral arrangement. In the claims it is understood that the phrases "opaque disk" and "opaque member" include a disk or member composed of opaque material with a spiral or linear slit or slot cut or otherwise formed therein to permit light to pass therethrough, and such phrases also include a disk or member comprising a base composed of transparent material having an opaque layer or surface portion in which is formed a spiral or linear slit or slot to permit the passage of light. In the claims it is also to be understood that when the slits or slots are described as being "continuously transparent from end to end," this includes slits or slots of the types formed in such "opaque disk" or "opaque member."

The line of graphic copy being scanned by the present scanning arrangement must be brightly and uniformly illuminated. Illumination is provided by two tubular fluorescent lamps. The scanned line of the copy is viewed between the lamps. Both lamps are operated on direct current or high frequency alternating current to prevent flicker. When direct current is used the polarities of the two lamps are reversed so that the cathode phenomena occur at opposite ends. With the lamps properly positioned, the copy is brightly illuminated because the phosphor surfaces of the lamps are physically near, and specular reflection is avoided. The illumination of a given copy element comes from at least an inch of each lamp surface so that lamp irregularities and striations are averaged out.

In order to conserve space, the optical path is folded by a front surface mirror. An enlarging objective lens converges the light through a coarse scanning disk to a focus substantially in the plane of a fine scanning spiral disk or of a linear window. An element including a straight linear horizontal aperture or window is located between the two disks, with the straight aperture and fine scanning spiral window within 0.01 inch of each other. The apertured light is collected by a stationary image of the straight window on the photo-cathode surface of a photomultiplier tube, so that, although the spiral-linear aperture sweeps across the image field, the light spot formed on the phototube does not move. A cylindrical lens is also used in the system to squeeze the light image on the photo-cathode from a circle to a generally elliptical form to conform to the cathode shape.

Power to drive the scanner is furnished by a synchronous motor. Two sets of toothed rubber timing belts drive the disk shafts. The disk shafts are concentric, the inner shaft driving the fine scanning disk at motor speed and an outer sleeve shaft driving the coarse scanning disk via a speed reduction pulley. A small separate motor drives a copy feed roller at a speed which has a predetermined relationship to that of the scanner motor.

There may be some loss of signal response near the ends of the scanning line sweep due primarily to the cosine fourth law of illumination characteristic of all objective lenses. In addition, some fall-off in signal response may result from the oblique angle of incidence at the photo-cathode for light arriving from the ends of the sweep, and from the reduced efficiency of the condenser lenses at wide angles. The total loss from all of these causes may be approximately thirty percent near the ends of the sweep. In order to correct for this light loss a mask is used having a light compensating aperture and located between the copy and the objective lens.

The continuous copy scanner thus briefly described overcomes the main objections to prior scanners. It is small, light, less expensive and relatively simple as to its optical system. There is no need to stop transmission for loading and unloading of drums, because copy can be fed into the scanner continuously. Inflexible or bound copy can be scanned by employing a moving frame mount for the copy. Because flood illumination of the scanned copy rather than the spot-type is employed, the requirements for shielding from ambient light are not critical.

In a modified form of the invention the optical system is simplified by replacing the fine scanning disk and condensing lenses with a flat disk including a spiral aperture and a groove having one side varying continuously in inclination with respect to the flat surface of the disk. The spiral groove has optical focusing properties. The disk serves as a deflector-collector element for light reflected from the scanned copy. In another modification a cylindrical lens having internal reflection and refraction properties is used to collect the light from the spiral-linear apertures and focus it on the photo-cathode of the phototube.

The invention will be best understood from the following description taken together with the drawings, wherein.

Figures 1, 2, 12, 13, 14:
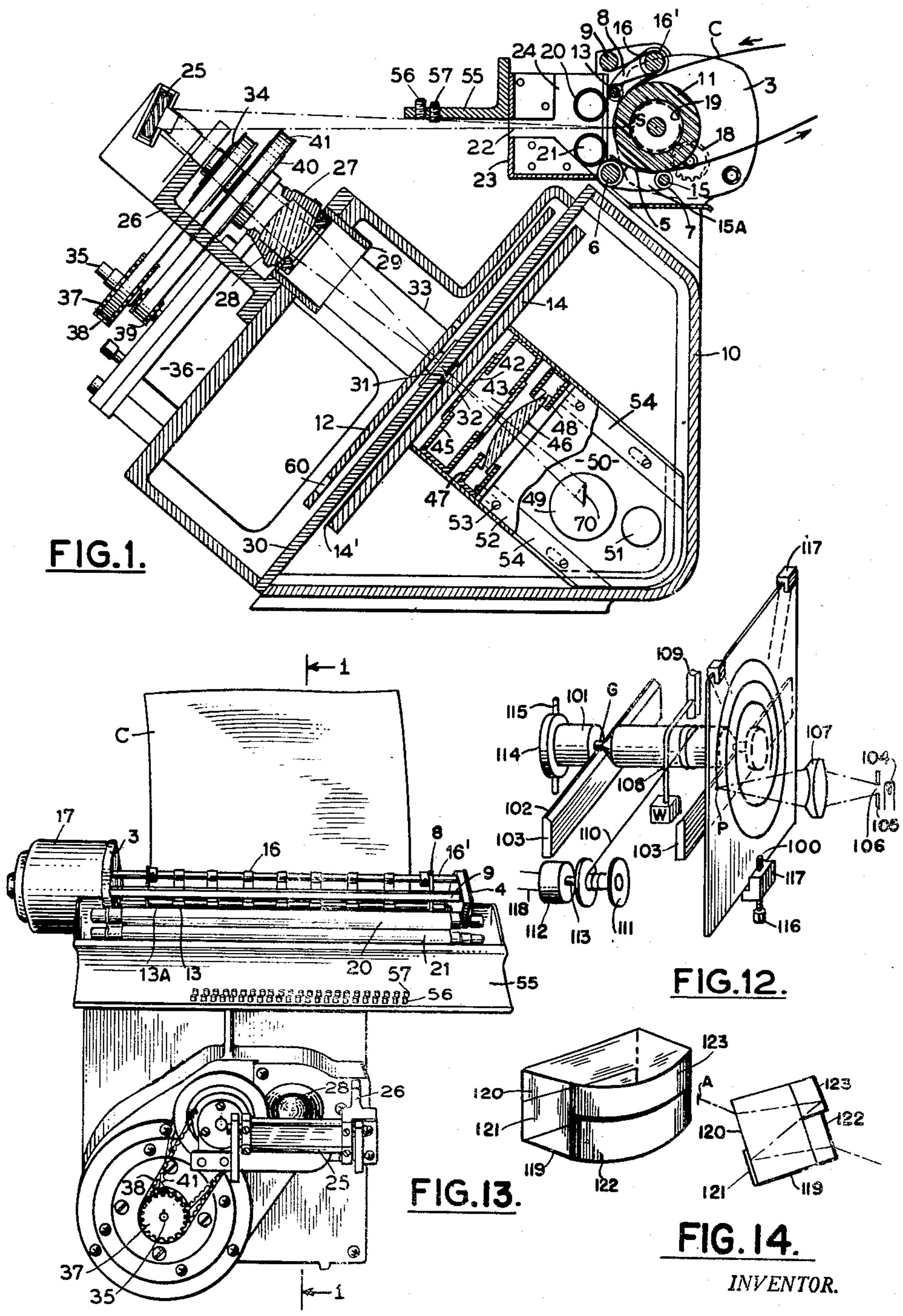
FIGS. 1 and 2 are sectional and rear views respectively of an apparatus embodying the invention.
FIG. 12 is a perspective view of an apparatus for generating a multiturn spiral as required by the invention.
FIG. 13 is a perspective view of an optical element which may be employed in the apparatus of FIG. 1.
FIG. 14 is an end view of the optical element of FIG. 13 illustrating the mode of operation of the element.

In FIGS. 1 and 2 are shown a preferred embodiment of the invention. A generally rectangular frame 10 serves as a support for copy roller 11, the scanning disks 12 and 14, and associated optical system. Copy C is fed continuously around roller 11 near one corner of frame 10. Pressure rollers 13, 15 maintain proper tension in the copy as it passes scanned line S. Rollers 13 and 15 carry rubber sleeves 13A and 15A respectively which press against the roller 11. Roller 13 is supported by arms 8 from stationary shaft 16'. Roller 15 is supported by arms 7 from stationary shaft 6. The U-shaped springs 16 are provided to keep copy C smooth and straight. Springs 16 are carried by stationary shaft 16'. One leg of each spring terminates under shaft 9 and the other leg rests on roller 11. Certain ones of springs 16 have one leg terminating under shaft 9 and the other leg pressing on shaft 13 between the sleeves 13A. A scoop plate 5 is supported by shaft 6 and serves to guide the paper C between rollers 11 and 7. Shafts 6, 9, 16' are supported in the end frame plates 3, 4. Plate 3 supports motor 17. Roller 11 is driven by motor 17 at a predetermined speed via a gear train 18, 19. A pair of tubular fluorescent lamps 20, 21 are disposed parallel to the scanned portion of the copy and flood light the entire scanned line S. A slot 22 is provided in the end wall 23 of the lamp housing 24. Light is reflected from the scanned line through slot 22 to a mirror 25. Mirror 25 is supported near one corner of frame 10 in the ends of a frame member 26, attached to the frame 10. Frame member 26 supports a lens assembly 27 which carries an objective lens 28. A lens barrel 29 is provided for the lens assembly 27 and is threaded in the frame member 26. The lens is focused by adjusting the position of the lens barrel in the frame member 26. The frame 10 is provided with a wall 30 in which is a wide slot. Over this slot is disposed a strip of opaque film 31 in which is a transparent straight aperture or window 59 as will be described in connection with FIGS. 3 and 4. Scanning disks 12 and 14 are disposed for rotation at the sides of wall 30. The fine scanning disk 14 rotates on shaft 32 and coarse scanning disk 12 rotates on a cylindrical or sleeve shaft 33. Shaft 32 is axially aligned with and rotates within shaft 33. Gear 34 is carried by shaft 32. Shaft 35 of synchronous motor 36 carries the larger gear 37 and small gear 39. Disk 14 rotates at the same rate as gears 34 and 37 and the shaft 35 of the synchronous motor 36. The gear 37 is operatively connected to gear 34 via a toothed rubber belt 38. The smaller gear 39 also carried by shaft 35 is operatively connected to a speed reduction gear 40 via toothed rubber belt 41. Gear 40 is carried on shaft 33 and causes rotation of disk 12 at a rate equal to $$\frac{1}{N}$$

times the rate of rotation of disk 14, where N equals the number of turns of the spiral aperture or window 58 in the film 14' carried by disk 14. A pair of flat spirally grooved condensing lenses 42, 43 is disposed in the optical housing 44 and carried on the sides of frame 45. A cylindrical condensing lens 46 is mounted in frame members 47, 48 and is disposed in the optical path of the lenses 42, 43. A photomultiplier tube 49 is disposed near one corner of frame 10 in a compartment 50 of the optical housing together with a cathode follower tube 51. The tubes 49, 51 are carried by a plate 52 secured by screws 53 to the flanges 54. The cover plate is shown partly cut away to expose the interior of the tube compartment. In an alternative arrangement, the cathode follower 51 can be disposed outside of compartment 50 and attached to a wall thereof or to the frame 10. In any case, the tubes 49 and 51 will be connected electrically as shown in detail in FIG. 8.

Instead of arranging shafts 32, 33 coaxially they may be disposed parallel to each other but spaced apart so that the disks 12 and 14 overlap only partially. Included in the area of overlap will be the straight window 59. In this modification strip 31, shaft 32 and disk 14 will remain in the positions shown in FIGS. 1 and 2 with shaft 32 driven by belt 38. Gears 39, 40 and belt 41 will be omitted. Disk 12 on shaft 33 will be provided with gear teeth which will mesh with a matching gear to be carried by shaft 32. The gear ratio will be such that disk 12 rotates at a speed equal to $$\frac{1}{N}$$

times the speed of disk 14, where N is the number of turns of spiral window 58. Slot 60 and spiral window 58 overlap in the area including straight window 59. In this arrangement, the several parts of the apparatus are not as compactly disposed as shown in FIG. 2, but the optical system and mode of operation are substantially unchanged.

In order to compensate for variations in signal response due to light losses along the line of scanning sweep and across the optical path, a light compensating device or mask is provided between copy C and objective lens 28. The device includes an L-shaped plate 55 secured to lamp housing wall 23. At least two rows of cylindrical elements such as flat-end set screws 56, 57 are disposed in overlapping relationship to form a continuum when viewed from the objective lens. When a screw is extended below the plate 55 is penetrates into the optical path, and when fully extended completely blocks light passing through slot 22 at the location of the screw. Another plate 55 provided with screws 56, 57 may be attached to lamp housing wall 23 below slot 22, with the screws arranged to project upwardly into the optical path. The two cooperating plates 55 would thus serve as an adjustable mask for controlling the cross sectional configuration of the optical path from below and above slot 22. Instead of screws, slidable pins held frictionally in overlapping apertures in the plate 55 may be used.

When a screw or pin is extended into the optical path it causes a reduction in response for the section of the copy which lies in its penumbra. By observing the response of the scanner to white copy (on an oscilloscope) and by adjusting the screw or pins 56, 57 it is possible to adjust the response across the scanning line to the linearity desired. Since the screws do not lie in a focal plane the effect of any single screw is a smoothly varying function, and since the response losses are also smoothly varying, the control afforded by the screws is adequate to produce a uniform response. Once the shape of the correcting aperture has been determined in this way, plate or plates 55 with screws 56, 57 can be replaced by a cut sheet metal mask. This light path correction is in the nature of an initial adjustment and need not be changed during normal operation of the scanner.

It may be found that the tubular lamps 20, 21 fall off somewhat in intensity of illumination at their ends so that the scanned line S is not uniformly illuminated. The mask may be suitably shaped to compensate for this effect. Also if the lamps are made longer than the scanned line S, this effect will be minimized.

Figure 3:
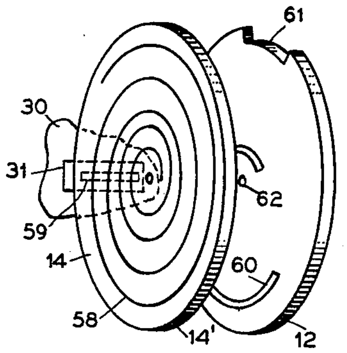
FIG. 3 is a perspective view of scanning elements employed in the apparatus of FIGS. 1 and 2.

The fine scanning disk 14 is shown diagrammatically in FIG. 3. The disk is a transparent plate with an opaque film layer 14'. A transparent multiturn spiral aperture or window 58 is formed in the opaque film layer 14' by photographic means as shown in FIG. 12. A straight linear aperture or window 59 is formed in the film strip 31 on plate 30 disposed between the plate and disk 14, and not more than 0.01 of an inch from the spiral aperture 58 in film 14'. Opaque disk 12 has a single turn spiral slot 60 formed therein and serves as a turn selector disk. A portion 61 of disk 12 is cut out to counterbalance the disk on its axis 62.

Figures 4, 9:
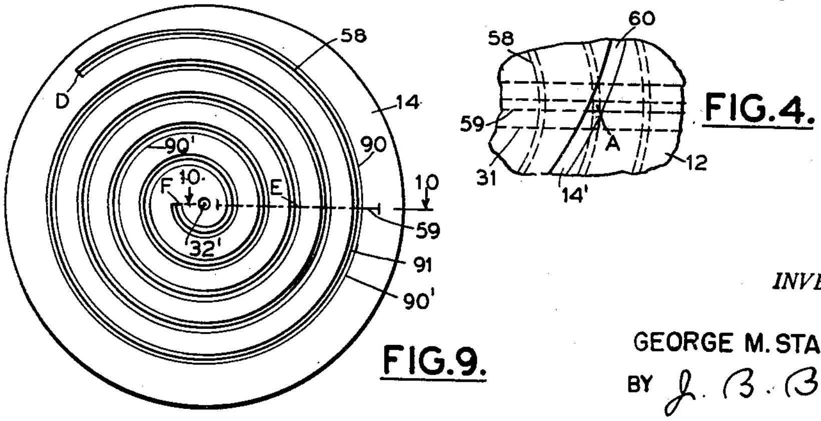

The width of linear aperture 59 limits the vertical size of the line scanning element A as shown in FIG. 4. The selection of the particular one of the N spiral turns which defines the scanning element A is determined by the single turn spiral slot 60. The slot 60 does not determine scanning definition but only selects the particular one of the N turns of spiral aperture 58 intersecting aperture 59 which shall be effective to define the scanning element A or aperture A. The size of the scanning element A is thus limited only by the intersecting widths of the spiral 58 and straight window 59.

The mode of operation of the scanning elements will now be readily apparent. As shown in FIG. 4, the spiral aperture 58 intersects the linear aperture 59 at a plurality of points equal to the number of turns N of the spiral aperture 58. When disk 14 rotates, the intersection of the spiral-linear apertures establishes N parallelogrammic apertures or elements A which travel along aperture 59. Since disk 14 rotates at constant speed, the apertures A move along aperture 59 at constant speed. Disk 12 also rotates at constant speed but at $$\frac{1}{N}$$

times the speed of disk 14. Thus only one aperture A is selected and is swept at constant speed across the stationary line defined by the linear aperture 59.

There are at least four basic and critical requirements for the spiral aperture 58 used in the present scanning system:

First, the spiral must have the right shape. Any departure from the correct shape produces distortions in the copy. A sudden "bend" or "kink" in the spiral is disastrous to the production of undistorted facsimile transmission. Thus the slope of the spiral at all points must be accurate, as well as the position.

Second, the spiral origin must be correctly centered on the axis of rotation of the disk shaft. An error or centering will cause the velocity of the sweeping aperture to vary in such a way that the spot successively leads and lags each revolution by a distance equal to the misalignment. A few thousandths of an inch of such misalignment produces detectable distortion.

Third, the aperture must be of uniform width, and errors in uniformity must become negligible when averaged out over a length of spiral corresponding to that of a single scanning element A. In the present embodiment the width of the spiral is substantially 0.002 inch and the length of the scanning element is less than two degrees of arc so that at least 1000 elements per sweep are effectively resolved with a five turn spiral.

Fourth, the light transmissivity of the aperture must be constant and high (i.e., it must be clear), and the region around the scanning aperture must be sensibly opaque.

A preferred method and appartus for forming a spiral scanning element satisfying the above requirements is shown in FIG. 12 to be described later.

Figure 5:
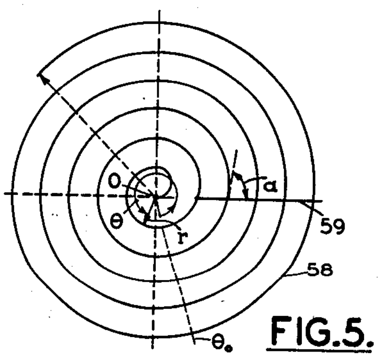

Mathematically, spiral 58 is a true Archimedes spiral as shown in FIG. 5. The Archimedes spiral has the property that $$r=K\theta$$

i.e., in polar coordinates the radius vector $r$ to any point on the curve is directly proportional to the angle turned from a radial reference line, $\theta_o$, where K is a constant. In particular, if $\theta$ changes at a constant rate, $r$ will increase at a constant rate, and $$\frac{dr}{dt}=\frac{Kd\theta}{dt}$$

It follows that the aperture formed by the intersection of the Archimedes spiral and the linear aperture 59 directed through the origin O (axis of rotation) moves at a linear rate of speed when the spiral is rotated at a constant number of revolutions per minute.

The slope of the angle of intersection, $\alpha$, between spiral and linear apertures is found from the velocity ratios, $$\frac{rd\theta}{dr}=\frac{r}{K}$$

Since the intersection angle $\alpha$ changes with $r$, the shape of the parallelogrammic scanning aperture A (see FIG. 6) also changes with $r$. In order to keep $\alpha$ greater than 80 degrees for small values of $r$, K must be kept small. However $\Delta r$, the sweep distance, must be great enough so that the width of the spiral aperture itself is not prohibitively small. Thus for high resolution systems capable of resolving from one to two thousand elements per sweep, either the spiral disk must be very large or the spiral must have more than one complete turn.

The multiturn, or fine spiral 58 shown in FIG. 3 has five turns and may rotate at 1800 r.p.m., which is a standard synchronous motor speed. Since the fine scanning disk 14 must make five revolutions to complete one sweep, the coarse scanning disk 12 must turn at one-fifth of 1800, or 360 r.p.m., which is the actual scanning rate.

In addition to permitting the use of smaller scannnig disks, the multiturn spiral has two other advantages. It virtually eliminates scanning "jitter," and it leads to an integrating effect which smooths out any defects of the spiral which may be present. This will be explained with reference to FIGS. 6 and 7.

In conventional lathe-type scanners one revolution of the drum corresponds to one scanning sweep. The percentage of jitter present in the facsimile signal is the percentage departure of the drum per revolution from an exactly repetitive motion. In a five-turn spiral scanner as disclosed herein the percentage of jitter present in the transmitted signal is the percentage departure of the disk per five revolutions from an exactly repetitive motion. In other words, for the same rotational irregularity, this spiral scanner has one-fifth the jitter of the equivalent drum scanner. Further, since the fine scanning disk turns at the same speed as that of motor 36, no reduction gearing is needed between the motor and the fine scanning disk and at 1800 r.p.m. a large fraction of the system loading is only smooth wind friction.

Figure 6:
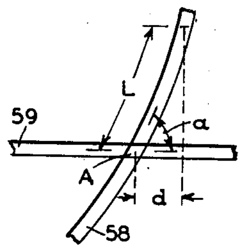
FIGS. 4, 5, 6, 7, are diagrams illustrating certain characteristics of the scanning elements.
Figure 7:
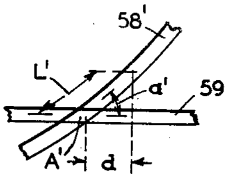

In FIGS. 6 and 7 are shown the parallelogrammic apertures A and A′. Aperture A is defined by one turn of a multiturn spiral 58 (having N turns) intersecting linear aperture 59, while aperture A′ may be defined by a single turn spiral 58′ intersecting a linear aperture 59. As indicated in FIGS. 6 and 7, for the same elemental sweep length *d*, the length L of aperture 58 which passes aperture 59 is N times greater than the length L′ of aperture 58′. Thus irregularities which may exist in the width of spiral aperture 58 and other irregularities in the system which could cause scanning jitter are averaged over N times as great a length in producing the parallelogrammic aperture A as in producing aperture A′. In general, irregularities in spiral width just detectable in an apparatus employing a one-turn spiral window could be almost N times as prominent before being detectable when an N turn spiral aperture 58 is used. Furthermore, the end turn spiral aperture 58 intersects linear aperture 59 at an angle $\alpha$ which is steeper than angle $\alpha'$. At positions close to the central axis of disk 14 the area of parallelogram A is increased due to the smaller intersection angle of the spiral and straight apertures. For whatever limit is placed on the maximum area of scanning aperture A, the N-turn spiral aperture produces its limiting area of parallelogram A closer to the center of disk 14 than a one-turn spiral 58′ of corresponding sweep distance. Thus a disk with an N-turn spiral aperture may have a smaller radius than a disk with a one-turn spiral aperture which sweeps across aperture 59. A contribution to improved scanning definition is further provided by use of an N-turn spiral aperture in that the steep turns of the spiral produce a parallelogrammic aperture A which more nearly approaches the ideal of a true rectangle than the stretched and flattened parallelogram A′ produced by single turn spiral 58′.

In operation of the apparatus shown in FIGS. 1 and 2 the copy C is advanced by the roller 11 at a predetermined rate by the speed of motor 17. Motor 17 may be a synchronous motor driven from the same power source as synchronous motor 36, or any other type of motor run at a predetermined speed with respect to that of motor 36. Lamps 20 and 21 illuminate the scanned line S with substantial uniformity along the line. The reflected light beam is directed to mirror 25 and reflected through objective lens 28. The lens 28 is focused substantially on the plane of spiral window 58 or linear window 59 so that the image of the scanned line S is centered on the linear window. As the fine scanning spiral window 58 is rotated via pulleys or gears 34, 37 and belt 38, the coarse scanning spiral window 60 is rotated via pulleys 39, 40 and belt 41 in coordination with spiral window 58 at $$\frac{1}{N}$$

times the rate of speed of spiral window 58. The speed of motor 17 is fixed so that the image of copy C focused on the aperture 59 or spiral window 58 is advanced a distance equal to the vertical width of the linear aperture 59 for each rotation of the disk 12 carrying the coarse scanning spiral 60. Condensing lenses 42, 43 and 46 focus the light from the successive scanned areas A on the photo-cathode 70 of the photomultiplier tube 49 to produce corresponding electrical impulses. In order to insure that the light projected on the photo-cathode is uniform throughout the length of the scanning line for white copy, the mask including screws 56, 57 may be adjusted in the optical path between copy C and the phototube until an oscilloscope connected to the output of the cathode follower tube 51 shows that uniformity of scanning has been attained.

Figure 8:
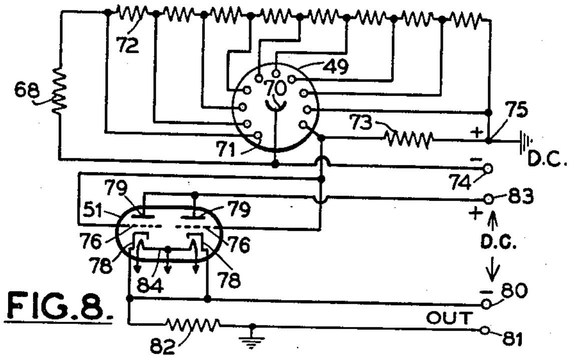
FIG. 8, is a diagram of a circuit employed in the apparatus.

The photomultiplier tube is preferably disposed in a circuit as shown in FIG. 8 to produce suitable electrical impulses to be transmitted to a facsimile recorder via a wire line or radio link. The phototube 49 has a plurality of dynodes 71. Each dynode is connected to a different point on resistor 72 in succession. The final dynode is grounded via resistor 73. Photo-cathode 70 is connected to the negative terminal 74 of a suitable D.C. source while the grounded terminal 74 is connected to the positive terminal of the D.C. source. A resistor 68 is connected between resistor 72 and photo-cathode 70. A constant D.C. voltage is maintained between the photo-cathode 70 and the first dynode 71, to insure efficient photoelectron collection by the phototube. Since the final dynode is grounded via resistor 73 the anode potential depends on the average velocity of electrons impinging upon it. The average velocity of electrons leaving the final dynode is a logarithmic function of the number of electrons reaching it, which in turn is a linear function of the quantity of light flux incident on photo-cathode 70. The voltage developed across load resistor 73, is thus a logarithmic function of the incident light. Since the human eye responds logarithmically, this circuit provides a logarithmically compressed response which matches that of the human eye. The output of the phototube 49 is delivered via the final dynode 71 to grids 76 of the cathode follower tube 51. The tube 51 is a dual triode with interconnected cathodes 78 and anodes 79. The output of the cathode follower is taken off terminals 80, 81 connected across cathode resistor 82. A suitable D.C. potential is connected to terminals 80 and 83, and heater elements 84 are energized in conventional manner.

Figures 10, 11:
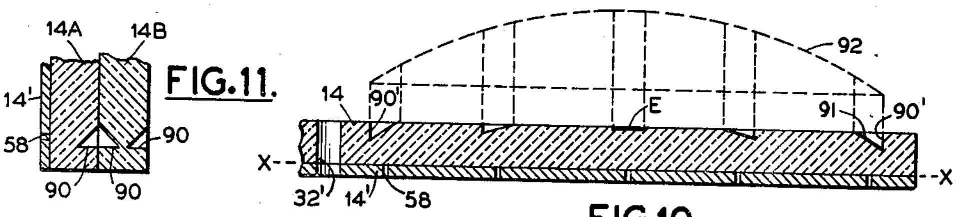
FIGS. 9 and 10 are plan and sectional views respectively of a modified scanning element.
FIG. 11 is a fragmentary sectional view of a further modified scanning element.

In FIGS. 9 and 10 there is shown a modification of the invention which makes possible omission of condensing lenses 42, 43, 46 in the apparatus of FIG. 1. The transparent disk 14 has mounted on one side the film layer 14′ including the multiturn spiral window 58. Aperture 32′ is provided to receive the shaft 32 shown in FIG. 1. On the other side of the disk 14 is a spiral groove 90 located so that spiral 58 is located between the lateral boundaries of the groove. Groove 90 is rather V-shaped in cross section. It has a substantially flat bottom or side 91 which is inclined to the planes *x—x* of the faces of the disk 14 and the spiral 58, and a vertical or steep side 90′. The angle of inclination of the bottom of the groove varies continuously from the inner end F to the outer end D of the groove. It will be noted that the groove bottom 91 is inclined at all points to duplicate in composite the curvature of a theoretical lens 92. Thus the inclination of the groove bottom is steepest at points D and F but inclined in opposite manner, while at point E, the midpoint of the groove taken along its length, the groove bottom is substantially parallel to plane *x—x* and almost coincident with the face of disk 14. The particular advantage of this modification of the invention is that disk 14 with groove 90 constitutes a light directing optical element for the moving scanning aperture A produced by intersection of apertures 58, 59 and selected by slot 60, as the disk 14 is rotated, to project aperture A on the photo-cathode 70 for all positions of the spiral aperture 58. The disk 14 thus serves the double purpose of carrying the spiral scanning aperture 58 and serving as a light collector and director. By this construction of disk 14 it is possible to eliminate one or all of the lenses 42, 43, 46 since as above mentioned the groove 90 can be arranged to focus the scanning aperture A directly on the photo-cathode 70 of the photomultiplier tube. If desired the composite inclination of the bottom of the groove can be made equivalent to that of an elliptical lens 92 so that spherical aberration effects are avoided.

In certain cases it may be desired to form disk 14 as an equivalent doublet. In this case the disk will have two laminations or layers 14A and 14B as shown in FIG. 11. Layer 14A will have the same type of groove 90 as shown in FIGS. 9 and 10. The layer 14B will have similar groove 90 in alignment or registration with groove 90 in layer 14A. In addition the outer or free face of layer 14B may also have a similar groove 90. With the arrangement of FIG. 11 in which film 14' carrying spiral window 58 is secured to disk layer 14A, the condensing lenses 42, 43, 46 shown in FIG. 1 may all be omitted.

In FIGS. 9, 10, 11, film layer 14' is shown attached to the ungrooved side of the disk. The film layer 14' can if desired, be mounted on the grooved side of the disk with the spiral 58 and groove 90 in the same relative position as shown in the FIG. 9. The arrangement of FIGS. 8, 9, is particularly advantageous in constructing a compact simplified scanner. If the disk is made of a transparent plastic material such as an acrylic monomer the groove 90 can be formed readily by compression molding or die casting. In an alternative construction, the disk 14 can be coated with a thin opaque film layer of lacquer or the like and the spiral 58 as well as groove 90 can be formed simultaneously by a stylus with a flat cutting surfaces which will form the groove bottom 91, while the angle of inclination of the stylus to the disk is continuously varied from end to end of the spiral groove. If the stylus is also oscillated up and down to form a spiral of dots, a spiral of dots will be formed which will generate a carrier signal so that the spiral acts as a "light chopper." If the proper wave form is fed to the cutting stylus a ptatern can be made which in the apparatus of FIG. 1 will cause the phototube to produce a sine wave signal at its output. When used in this way the disk 14 combines in one member the functions of a scanning element, light director, and light chopper. Instead of oscillating the stylus, a light chopper can be produced by modulating sinusoidally or intermittently the light emitted by lamp 104 in FIG. 12, as the spiral is generated on plate 100.

In FIG. 13, is shown an optical device usable in the apparatus of FIG. 1. FIG. 13 shows a transparent lens 119 having five flat sides and one convex cylindrical side. The upper half of the convex side 122 is silvered to provide the internally reflecting concave mirror surface 123. The lower half of the opposite flat side 120 is silvered to provide the internally reflecting plane mirror surface 121. The lens 119 may be used to replace the condensing lenses 42, 43, 46 shown in FIG. 1 and thus simplify the optical system.

The mode of operation of the lens 119 is shown in FIG. 14. Light from the moving scanning aperture A is directed to the lens in a plane which is so disposed that the light enters the clear portion of face 120 at an acute angle thereto. The light is refracted and converged at face 120 and directed to the concave mirror surface 123 where the light is internally reflected and converged to the plane mirror surface 121. At mirror surface 121 the light is internally reflected back to the convex face 122 where it is refracted and converged as it issues from the clear portion of the face 122. The plane of light entering the lens is parallel to the plane of light leaving the lens. The convergent light leaving the lens 119 is focused on the photo-cathode 70 of phototube 49. The sequence of convergent refraction, convergent reflection, plane reflection, and convergent refraction in a single transparent optical element produces a more powerful condensing effect than is obtainable from any single element refracting lens. When used as a light collector in the scanner apparatus shown in FIG. 1, the surface of mirror 123 is cylindrical. If convergence in the vertical plane is desired the side 122 as well as mirror surface 123 can be made spherical. The shape of the light spot produced at photo-cathode 70 by the lens 119 is generally elongated and narrowed in a manner similar to the elongation produced by cylindrical lens 46. This shape of light spot it has been found causes a greater excitation of the photo-cathode than is obtainable with a round or square spot of equal area where the photo-cathode is elongated in shape. If the photo-cathode is circular, then the lens 46 will preferably be curved spherically rather than cylindrically and if lens 119 is used the side 122 and mirror 123 will be curved spherically.

In FIG. 12 is shown a preferred apparatus for generating the multiturn spiral 58. A glass plate 100 having a photosensitive surface is mounted by supports 117 on the end of a shaft 101. The shaft has grooves G corresponding in shape to the bevelled edges 102 of the straight rails 103 to prevent axial movement of the shaft across the rails. A lamp 104 is positioned to one side of a plate 105 which has a small rectangular aperture 106. Optical system 107 is disposed between plates 100 and 105. The optical system projects a small rectangle of light at point P. A weight W is suspended by a strap 108 over shaft 101 from a stationary post 109. Cord 110 is wound on shaft 101 and spool 111. The center section of spool 111 has a smaller diameter than shaft 101. A motor 112 carries and rotates spool 111 on shaft 113. A flywheel 114 is provided at one end of shaft 101 to balance plate 100. A rod or screw 115 is disposed in flywheel 114 and is adjustable diametrically. A screw 117 is provided in the centrally disposed clamp 116 and is adjustable therein. The screws 115 and 117 provide means for dynamically balancing the shaft 101 and plate 100. The apparatus of FIG. 12 is thus arranged to insure that shaft 101 rolls on rails 103 without slipping or shaking. The locus of point P which is initially aligned with the axis of shaft 101 generates a true Archimedes spiral as the shaft 101 rotates. Motor 112 is energized via conductors 118 and causes shaft 101 to roll by winding up the cord 110 on spool 111 as it unwinds from shaft 101. The locus of point P is a spiral which forms photographically on plate 100. In order that the exposure to light at P shall remain constant, the speed of motor 112 is continuously increased so that the spot velocity of P with respect to the plate 100 remains constant. After the exposure of the plate, it is developed by a conventional photographic process to produce a negative consisting of a fine black spiral line on the glass plate. A positive photographic print is made of this spiral line, to produce a scanning element in the form of an opaque film 14' having a multiturn spiral window or aperture 58 as shown in FIG. 3.

Although the invention has been described with reference to a fine scanning element having a five turn spiral it will be apparent that a multiturn spiral having a greater or lesser number of turns may be used. Other modifications may be made without departing from the spirit and scope of the invention as defined by the following claims.

What is claimed is:

1. A facsimile scanner for graphic copy, comprising a substantially rectangular frame, means disposed near one corner of the frame for moving said copy continuously, at least one elongated lamp disposed to illuminate a line of said copy, a phototube disposed near another corner of the frame, a mirror disposed near a third corner of the frame to establish a folded optical path from the copy to the phototube, and a plurality of scaning elements disposed in said optical path, said elements consisting of a first disk having a fine, continuous multiturn spiral scanning window and a member having a straight linear window intersecting the spiral window to define a plurality of scaning apertures, and another disk having an aperture selecting opening disposed adjacent to the first disk, the disks being rotatable in coordination with each other at rates having a predetermined relationship to the rate of movement of the copy.

2. A scanner according to claim 1, wherein said other disk includes a continuous single turn spiral slot, and the multiturn spiral window has a line width of substantially 0.002 of an inch from end to end thereof, the width of said slot being less than the distance between adjacent turns of the spiral window.

3. A scanner according to claim 1, wherein a mask is disposed to adjust the intensity of light across the optical path and said mask comprises at least one plate , a plurality of rows of cylindrical elements carried by the plate, each of said elements being independently extendable into said path, with the elements in the several rows being overlapped to form a complete light blocking means when fully extended in said path.

4. A continuously scanning facsimile apparatus, comprising a first flat opaque disk having therein a fine multiturn spiral slit disposed in an optical path, means for rotating said disk on an axis perpendicular thereto, a stationary opaque member disposed close to said disk, said member having a fine linear slit disposed in said path with the linear slit intersecting optically the spiral slit to define therewith a plurality of scanning apertures, said apertures being repeatedly movable along the linear slit during rotation of the disk, each of the slits being continuously transparent from end to end thereof, another rotatable opaque disk disposed close to the first disk and having a spiral coarse slot therein, means for rotating said other disk on an axis perpendicular thereto at a speed equal to $$\frac{1}{N}$$

times the speed of rotation of the first disk, where N is the number of turns of the spiral slit, said other disk being disposed so that only one of said scanning apertures is exposed in said optical path through said slot during rotation of the disks, means for supporting and continuously advancing a graphic copy sheet in said optical path in one direction simultaneously with rotation of said spiral slit, said direction being substantially perpendicular to said linear slit, a stationary lens arranged to focus an image of a single transverse line of said copy sheet substantially on one of said slits so that only said line is repeatedly scanned by said one scanning aperture during rotation of the first disk, a mirror disposed in said path to bend the path and shorten the geometrical distance between opposite ends thereof, and elongated tubular lamp means having a length at least as long as said line disposed at one end of the optical path and arranged to flood illuminate said single line of the copy sheet, the continuous advancement of said copy sheet in said direction causing successive tranverse lines on said copy sheet to be scanned one line at a time by said one moving scanning.

5. A continuously scanning facsimile apparatus, comprising a first flat opaque disk having therein a multiturn spiral fine slit disposed in an optical path, means for rotating said member on an axis perpendicular thereto, a stationary opaque member disposed close to said disk, said member having a linear fine slit disposed in said path with the linear slit intersecting optically the spiral slit to define therewith a plurality of scanning apertures, said apertures being repeatedly movable along the linear slit during rotation of the disk, each of the slits being continuously transparent from end to end thereof, another rotatable opaque disk disposed close to the first disk and having a spiral coarse slot therein, means for rotating said other disk on an axis perpendicular thereto at a speed equal to $$\frac{1}{N}$$

times the speed of rotation of the first disk, where N is the number of turns of the spiral slit, said other disk being disposed so that only one of said scanning apertures is exposed in said optical path through said slot during rotation of the disks, means for supporting and continuously advancing a graphic copy sheet in said optical path in one direction simultaneously with rotation of said spiral slit, said direction being substantially perpendicular to said linear slit, a first stationary lens arranged to focus an image of a single transverse line of said copy sheet substantially on said linear slit so that only said line is repeatedly scanned by said one scanning aperture during rotation of the first disk, a mirror disposed in said path to bend the path and shorten the geometrical distance between opposite ends thereof, elongated tubular lamp means having a length at least as long as said line disposed at one end of the optical path and arranged to flood illuminate the copy sheet, means for supporting a photoelectric cell at the other end of said path, and another stationary lens disposed between said cell and member and arranged to focus light from the linear slit substantially on the photoelectric cell, the continuous advancement of said copy sheet in said direction causing successive transverse lines on said copy sheet to be scanned one line at a time by said one moving scanning aperture.

6. A continuously scanning facsimile apparatus, comprising a first flat opaque disk having therein a fine multiturn spiral slit disposed in an optical path, means for rotating said member on an axis perpendicular thereto, a stationary opaque member disposed close to said disk, said member having a fine linear slit disposed in said path with the linear slit intersecting optically the spiral slit to define therewith a plurality of scanning apertures, said apertures being repeatedly movable along the linear slit during rotation of the disk, each of the slits being continuously transparent from end to end thereof, another rotatable opaque disk disposed close to the first disk and having a spiral coarse slot therein, means for rotating said other disk on an axis perpendicular thereto at a speed equal to $$\frac{1}{N}$$

times the speed of rotation of the first disk, where N is the number of turns of the spiral slit, said other disk being disposed so that only one of said scanning apertures is exposed in said optical path through said slot during rotation of the disks, means for supporting and continuously advancing a graphic copy sheet in said optical path in one direction simultaneously with rotation of said spiral slit, said direction being substantially perpendicular to said linear slit, a first stationary lens arranged to focus an image of a single transverse line of said copy sheet substantially on said linear slit so that only said line is repeatedly scanned by said one scanning aperture during rotation of the first disk, a mirror disposed in said path to bend the path and shorten the geometrical distance between opposite ends thereof, elongated tubular lamp means having a length at least as long as said line disposed at one end of the optical path and arranged to flood illuminate said single line of the copy sheet, means for supporting a photoelectric cell at the other end of said path, another stationary lens disposed between said cell and member and arranged to focus light from the linear slit substantially on the photoelectric cell, the continuous advancement of said copy sheet in said direction causing successive transverse lines on said copy sheet to be scanned one line at a time by said one moving scanning aperture, and a mask disposed across said optical path to compensate for non-uniformity of illumination of said single line of the copy sheet and effect linearization of amplitudes of pulses produced by said photoelectric cell.

7. A continuously scanning facsimile apparatus, comprising a first flat opaque disk having therein a fine multi-turn spiral slit disposed in an optical path, means for rotating said member on an axis perpendicular thereto, a stationary opaque member disposed close to said disk, said member having a fine linear slit disposed in said path with the linear slit intersecting optically the spiral slit to define therewith a plurality of scanning apertures, said apertures being repeatedly movable along the linear slit during rotation of the disk, each of the slits being continuously transparent from end to end thereof, another rotatable opaque disk disposed close to the first disk and having a spiral coarse slot therein, means for rotating said other disk on an axis perpendicular thereto at a speed equal to $$\frac{1}{N}$$

times the speed of rotation of the first disk, where N is the number of turns of the spiral slit, said other disk being disposed so that only one of said scanning apertures is exposed in said optical path through said slot during rotation of the disks, means for supporting and continuously advancing a graphic copy sheet in said optical path in one direction simultaneously with rotation of said spiral slit, said direction being substantially perpendicular to said linear slit, a first stationary lens arranged to focus an image of a single transverse line of said copy sheet substantially on said linear slit so that only said line is repeatedly scanned by said one scanning aperture during rotation of the first disk, a mirror disposed in said path to bend the path and shorten the geometrical distance between opposite ends thereof, elongated tubular lamp means having a length at least as long as said line disposed at one end of the optical path and arranged to flood illuminate said single line of the copy sheet, a photoelectric cell at the other end of said path, another stationary lens disposed between said cell and member and arranged to focus light from the linear slit substantially on the photoelectric cell, the continuous advancement of said copy sheet in said direction causing successive transverse lines on said copy sheet to be scanned one line at a time by said one moving scanning aperture, and a mask disposed in said optical path, said mask comprising a plate, a plurality of rows of threaded elements carried by said plate, each of said elements being independently extendable into said path, the elements in the several rows being overlapped to form a complete light blocking means when fully extended in said path.

8. A continuously scanning facsimile apparatus, comprising a first flat opaque disk having therein a fine multi-turn spiral slit of substantially uniform width from end to end thereof, said slit being disposed in an optical path, means for rotating said member on an axis perpendicular thereto, a stationary opaque member disposed close to said disk, said member having a fine linear slit disposed in said path with the linear slit intersecting optically the spiral slit to define therewith a plurality of scanning apertures, said apertures being repeatedly movable along the linear slit during rotation of the disk, each of the slits being continuously transparent from end to end thereof, another rotatable opaque disk disposed close to the first disk and having a spiral coarse slot therein, means for rotating said other disk on an axis perpendicular thereto at a speed equal to $$\frac{1}{N}$$

times the speed of rotation of the first disk, where N is the number of turns of the spiral slit, said other disk being disposed so that only one of said scanning apertures is exposed in said optical path through said slot during rotation of the disks, means for supporting and continuously advancing a graphic copy sheet in said optical path in one direction simultaneously with rotation of said spiral slit, said direction being substantially perpendicular to said linear slit, a first stationary lens arranged to focus an image of a single transverse line of said copy sheet substantially on said linear slit so that only said line is repeatedly scanned by said one scanning aperture during rotation of the first disk, a mirror disposed in said path to bend the path and shorten the geometrical distance between opposite ends thereof, elongated tubular lamp means having a length at least as long as said line disposed at one end of the optical path end arranged to flood illuminate said single line of the copy sheet, a photoelectric cell disposed at the other end of said path, another stationary lens disposed between said cell and member and arranged to focus light from the linear slit substantially on the photoelectric cell, the continuous advancement of said copy sheet in said direction causing successive transverse lines on said copy sheet to be scanned one line at a time by said one moving scanning aperture, a mask disposed across said optical path to compensate for non-uniformity of illumination of said single line and effect linearization of amplitudes of pulses produced by said photoelectric cell and a circuit including a cathode follower tube connected to said cell and arranged to produce electrical pulses varying logarithmically in amplitude with respect to the pulses produced by said photoelectric cell.

9. A facsimile scanner for graphic copy, comprising a frame, means disposed on a part of the frame for moving said copy continuously in one direction, an elongated lamp disposed to illuminate a line of said copy extending transversely to said direction, a phototube disposed on another part of the frame, a mirror disposed on a third part of the frame to establish a folded optical path from the copy to the phototube via the mirror, a plurality of scanning elements disposed in said optical path, said elements comprising a disk having a fine continuous spiral scanning window and a member having a straight window intersecting the spiral window, said straight window extending substantially perpendicular to said one direction, said disk being rotatable in coordination with movement of said copy.

10. A facsimile scanner according to claim 9, further comprising a light mask disposed in said optical path, said mask comprising a plurality of generally cylindrical elements disposed in overlapping array and independently movable in said path.

No references cited.